(12) United States Patent
Xu et al.

(10) Patent No.: US 7,490,158 B2
(45) Date of Patent: Feb. 10, 2009

(54) MULTICAST TRANSFER RATE PROBE

(75) Inventors: Zhangwei Xu, Redmond, WA (US);
Wesley Witt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1044 days.

(21) Appl. No.: 10/697,375

(22) Filed: Oct. 30, 2003

(65) Prior Publication Data

US 2005/0108421 A1 May 19, 2005

(51) Int. Cl.
*G06F 15/13* (2006.01)
(52) U.S. Cl. .................. 709/231; 709/203; 709/224; 709/228; 709/229; 709/232; 709/236; 709/237; 370/233; 370/234; 370/235

(58) Field of Classification Search .................. 709/203, 709/224, 228, 229, 231, 232, 236, 237; 370/233, 370/234, 235
See application file for complete search history.

(56) References Cited

U.S. PATENT DOCUMENTS

| | | | | |
|---|---|---|---|---|
| 5,838,681 A | * | 11/1998 | Bonomi et al. | 370/395.41 |
| 6,496,477 B1 | * | 12/2002 | Perkins et al. | 370/228 |
| 6,556,542 B1 | * | 4/2003 | Sudo et al. | 370/236.1 |
| 6,563,822 B1 | * | 5/2003 | Aoki | 370/390 |
| 2002/0194325 A1 | * | 12/2002 | Chmaytelli et al. | 709/224 |

* cited by examiner

*Primary Examiner*—Jinsong Hu
(74) *Attorney, Agent, or Firm*—Lee & Hayes, PLLC

(57) ABSTRACT

A system and method for probing a plurality of clients for a rate appropriate for multicasting is described. In one implementation, test data is sent by a server to a plurality of clients. A rate, $R_i$, based at least in part on a rate at which test data was received, is sent by at least some of the plurality of clients to the server. A rate, $R_0$, at which an image is to be sent to the plurality of clients, is then calculated as a function of at least some of the $R_i$.

30 Claims, 13 Drawing Sheets

302
FORMULATE TEST DATA FOR TRANSMISSION TO A PLURALITY OF CLIENTS

402: ALTERNATIVE 1
OBTAIN A SELECTED PERCENTAGE OF THE IMAGE

404: ALTERNATIVE 2
VARYING THE AMOUNT OF TEST DATA GENERATED OR SELECTED AND SENT, TO BALANCE RELIABILITY AND COST

406: ALTERNATIVE 3
OBTAIN A QUANTITY OF DATA OF A SELECTED SIZE FROM THE IMAGE

408: ALTERNATIVE 4
OBTAIN DATA FROM THE IMAGE, WHEREIN THE DATA SELECTED IS SUFFICIENT TO RESULT IN TRANSMISSION OVER A SELECTED PERIOD OF TIME

*Fig. 4*

304
SEND TEST DATA TO A PLURALITY OF CLIENTS

502: OPTIONAL ELEMENT 1
SEND TEST DATA TO THE PLURALITY OF CLIENTS BY OPERATION OF A RELIABLE MULTICAST SESSION

504: OPTIONAL ELEMENT 2
SEND AN INITIAL TRANSMISSION OF DATA; SET A TIMER; AND SEND ADDITIONAL DATA UNTIL THE TIMER EXPIRES

506: OPTIONAL ELEMENT 3
SEND A PORTION OF THE IMAGE AT AN INITIAL TRANSFER RATE

508: OPTIONAL ELEMENT 4
SEND A FIRST PORTION OF THE IMAGE AT A FIRST RATE;
SEND A SECOND PORTION OF THE IMAGE AT A SECOND RATE

*Fig. 5*

306
RECEIVE Ri VALUES FROM EACH OF THE CLIENTS

602: OPTIONAL ELEMENT 1
RECEIVE A UDP PACKET FROM EACH OF THE PLURALITY OF CLIENTS

604: OPTIONAL ELEMENT 2
RECEIVE DATA-TRANSFER STATISTICS FROM EACH OF THE PLURALITY OF CLIENTS

606: OPTIONAL ELEMENT 3
SET A TIMER TO INDICATE A MAXIMUM PERIOD OF TIME DURING WHICH TO WAIT FOR A CLIENT RESPONSE; RECEIVE DATA-TRANSFER STATISTICS WITHIN THE TIME PERIOD

*Fig. 6*

308
CALCULATE RATE $R_0$ AT WHICH TO SEND AN IMAGE

702: ALTERNATIVE 1
SET $R_0$ EQUAL TO THE MINIMUM $R_I$ FOR ALL I

704: ALTERNATIVE 2
FORM AT LEAST TWO GROUPS OF CLIENTS, BASED ON EACH CLIENT'S $R_I$ VALUE; SELECT THE SMALLEST $R_I$ FROM WITHIN THE AT LEAST ONE GROUP

706: ALTERNATIVE 3
SELECT ONE OF THE $R_I$;
SET $R_0$ EQUAL TO THE SELECTED $R_I$, LESS A DE-RATING FACTOR

*Fig. 7*

802
RECEIVE TEST DATA FROM A SERVER

902: OPTIONAL ELEMENT 1
RECEIVE A PORTION OF AN IMAGE AT AN INITIAL TRANSFER RATE

904: OPTIONAL ELEMENT 2
RECEIVE AN INITIAL TRANSMISSION OF TEST DATA; SET A TIMER; RECEIVE ADDITIONAL TEST DATA UNTIL THE TIMER EXPIRES

906: OPTIONAL ELEMENT 3
DECRYPT AND DECOMPRESS THE RECEIVED TEST DATA; WRITE THE DECRYPTED AND DECOMPRESSED TEST DATA TO A DISK

*Fig. 9*

804
CALCULATE A RATE $R_i$ AT WHICH THE TEST DATA WAS RECEIVED

1002: ALTERNATIVE 1
SET THE RATE $R_i$ EQUAL TO AN AVERAGE RATE AT WHICH DATA WAS RECEIVED

1004: ALTERNATIVE 2
SET THE RATE $R_i$ EQUAL TO AN MINIMUM RATE AT WHICH DATA WAS RECEIVED

1006: ALTERNATIVE 3
SET THE RATE $R_i$ AS A FUNCTION OF THE RATE AT WHICH DATA WAS RECEIVED ACCORDING TO A DESIRED METHOD; DE-RATE THE $R_i$ TO A SAFER VALUE

*Fig. 10*

806
SEND THE RATE RI TO THE SERVER

1102: OPTIONAL ELEMENT 1
UTILIZE UDP PACKETS WHEN SENDING THE RATE RI TO THE SERVER

1104: OPTIONAL ELEMENT 2
SEND TRANSFER RATE STATISTICS INCLUDING THE RATE RI TO THE SERVER

*Fig. 11*

MULTICAST TRANSFER RATE PROBE

TECHNICAL FIELD

The present disclosure generally relates to reliable multicast of data to a plurality of targets, and selection of a rate at which to send the data.

BACKGROUND

In some applications, large numbers of computers may require the application of large software images, such as an operating system (OS). For example, a group including hundreds of servers may be connected to the Internet to support a well-known website; these servers may be considered to be clients or "targets". It may be necessary to download to the targets an OS image from a master server, or simply a "server". Such a download may be prompted by creation of the group, or by a software update which must be applied to the group. To facilitate the download of the OS image to the targets, the server may use a multicast system.

The multicast involves the transmission from the server to large numbers of clients or targets of large data files or "images" which may be encrypted and/or compressed. Upon receipt of the data, each target is configured to decrypt and decompress the data, and to store the resulting data on the hard drive. Where the targets are not a homogeneous group, there may be a wide discrepancy in the rate at which different targets process and store the data. Accordingly, some targets may receive data at a rate that is slower than that at which they could accurately receive and process the data, while other targets may be unable to receive and process the incoming data without error.

Accordingly, a need exists for an improved method and procedure for multicasting data, wherein a rate of data transfer is selectable to result in a desired outcome.

SUMMARY

A system and method for probing a plurality of clients for a rate appropriate for multicasting is described. In one implementation, test data is sent by a server to a plurality of clients. A rate, $R_i$, based at least in part on a rate at which test data was received, is sent by at least some of the plurality of clients to the server. A rate, $R_O$, at which an image is to be sent to the plurality of clients, is then calculated as a function of at least some of the $R_i$.

BRIEF DESCRIPTION OF THE DRAWINGS

The same reference numerals are used throughout the drawings to reference like components and features.

FIG. 4 shows alternative implementations of the test data formulation block of FIG. 3.

FIG. 5 shows elements which may be included in implementations of the send test data block 304 of FIG. 3.

FIG. 6 shows elements which may be included in implementations of the receive $R_i$ values block 306 of FIG. 3.

FIG. 7 shows alternative implementations of the calculate $R_O$ block 308 of FIG. 3.

FIG. 9 shows optional elements which may be included within implementations of the receive test data block 802 of FIG. 8.

FIG. 10 shows alternative implementations of the calculate a rate $R_i$ block 804 of FIG. 8.

FIG. 11 shows optional elements which may be included within implementations of the send the rate $R_i$ block 806 of FIG. 8.

DETAILED DESCRIPTION

Overview

The following discussion is directed to systems and methods by which a server may transmit a large data file, such as an operating system (i.e. an "image") to a plurality of clients (i.e. "targets") based on a multicast transmission. Prior to the transmission, the server performs a multicast transfer rate probe, i.e. a probe by which a rate for the transmission of the image is established. In one implementation, test data is selected and sent by the server to the plurality of clients. A rate, $R_i$, at which each of the plurality of clients receives and processes the test data is established by the respective client, and then transmitted to the server. The server then calculates a rate, $R_O$, at which an image is to be sent to the plurality of clients, as a function of the $R_i$. As a result of the multicast transfer rate probe process, the selected data transfer rate, $R_O$, provides reliable data transfer for all, or a selected group, of the clients.

The system and method provides a number of advantages. In particular, better estimation of the capacity of each client to receive and process data results from selection by the server of subsets of the image for use as test data. Additionally, by configuring the clients to select an appropriate algorithm by to determine an $R_i$ associated with that client's performance, the $R_i$'s sent to the server may be tailored to meet the needs of the system. Similarly, by configuring the server to select an appropriate algorithm by which to determine $R_O$, based on the input $R_i$'s, the system can be further tailored. Additionally, by providing the image to the clients by means of reliable multicast, and by allowing the clients to communicate with the server by means of a UDP (user datagram protocol), the method and associated systems are scalable to allow data multicast to large numbers of clients.

Exemplary Environment

Figure 1:
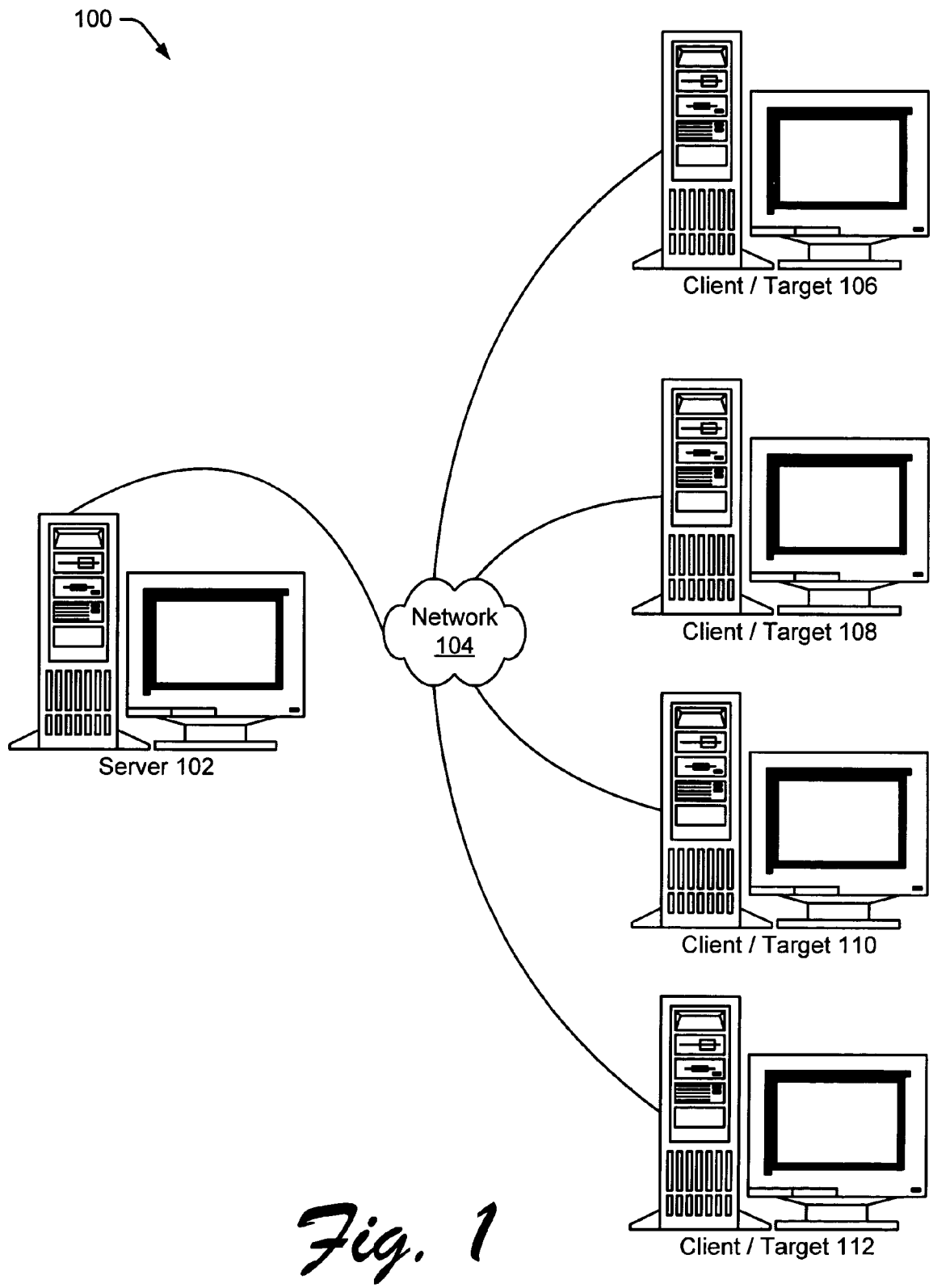
FIG. 1 illustrates an exemplary environment within which multicast transfer rate probing could be employed.

FIG. 1 illustrates an exemplary environment 100 within which a large image, such as an operating system (OS) may be multicast. In particular, a server 102 is configured for multicasting, and for multicast transfer rate probing, over a network 104. An arbitrarily large number of clients, illustrated for simplicity as clients 106-112 are connected to the network 104. The network 104 may by any kind of network, exhibit any type of topology and utilize any type of network technology. The clients 106-112 may be homogeneous or heterogeneous. However, as will be seen in greater detail below, the elements discussed solve problems that are frequently related to circumstances wherein the clients are heterogeneous-particularly wherein the clients exhibit differing abilities to receive, decrypt, decompress and store information sent by a server utilizing multicasting- or reliable multicasting-based transmission.

While a variety of communications technologies may be used, an exemplary system environment 100 employs Reliable Multicast data transmission between the server 102 and clients 106-112. Where the clients 106-112 do not yet have an OS image on their hard drives, they may still be configured to communicate via BMSS (BIG monitor sub system) or alternate technology. Additionally, to avoid opening a TCP connection between each client and the server 102, the clients may communication with the server by means of a UDP (user datagram protocol). This results in scalability, in that overhead is reduced.

Figure 2:
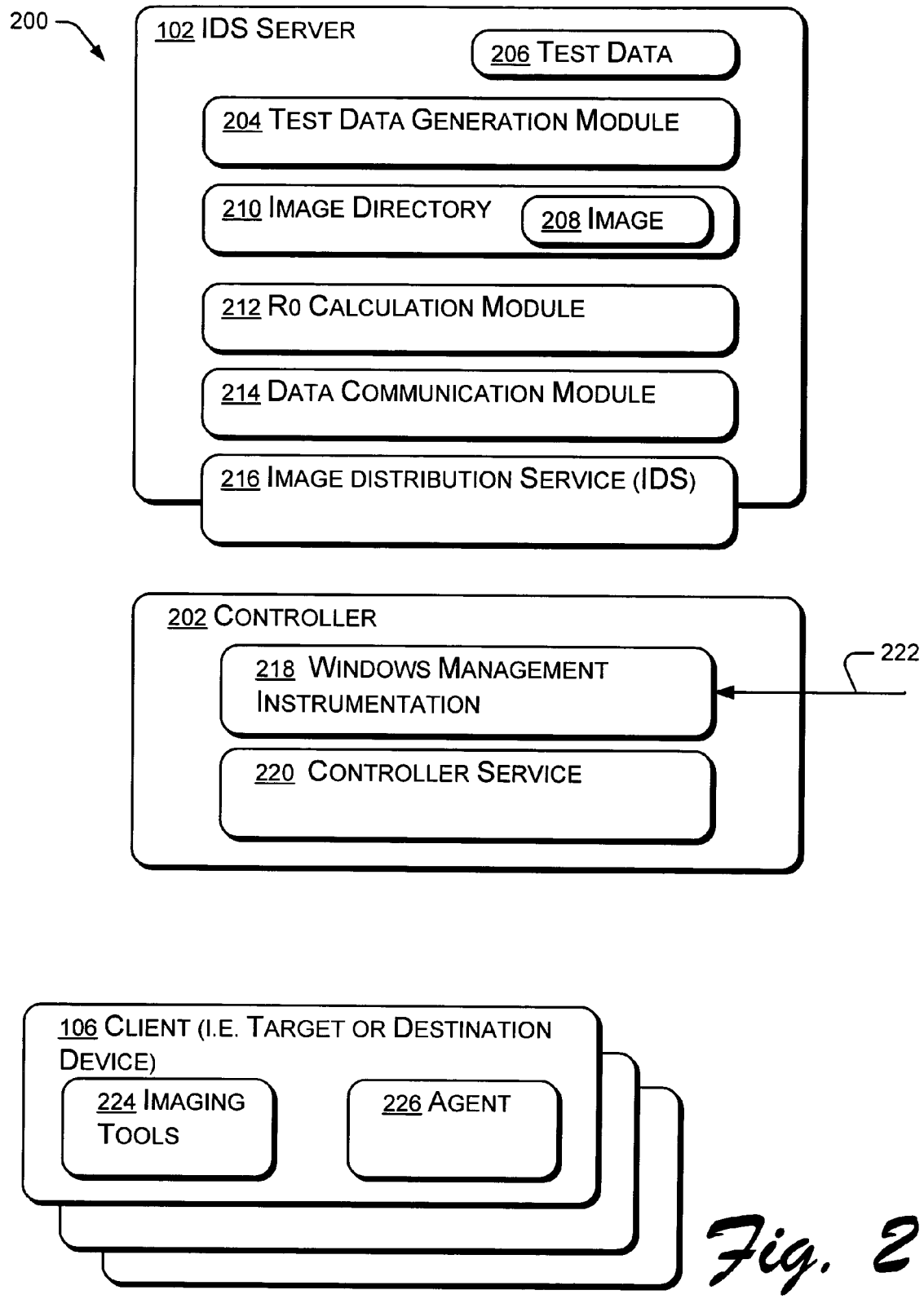
FIG. 2 illustrates an exemplary system within which multicast transfer rate probing could be employed.

FIG. 2 illustrates an exemplary system 200 within which multicast transfer rate probing could be employed. An IDS (image distribution service) server 102 is associated with a controller 202. An exemplary controller 202 is configured software, and typically resides on the same machine as the IDS server 102.

An exemplary server 102 includes a test data generation module 204. The test data generation module 204 generates test data 206 for transmission to a plurality of clients 106-112. In a preferred implementation, the test data 206 is a subset of an image 208 to be sent to the plurality of clients. The image 208 may be obtained from a directory 210, which may include a plurality of images, each for use under appropriate circumstances. For example, the image 208 may be an operating system and/or applications for deployment on the clients. The operation of the test data generation module 204 may be further understood by referencing the discussion of block 302 in FIG. 3 and the discussion of FIG. 4.

An $R_0$ calculation module 212 is configured to receive a rate $R_i$ at which the test data 206 was received by each of the plurality of clients 106-112. Additionally, the $R_0$ calculation module 212 calculates the rate $R_0$ at which to send the image 208 to the plurality of clients 106-112, wherein the rate $R_0$ is a function of the $R_i$. The operation of the $R_0$ calculation module 212 may be further understood by referencing the discussion of block 308 of FIG. 3 and the discussion of FIG. 7.

A data communication module 214 and an image distribution service (IDS) 216 are configured to multicast the test data 206 and the image 208 to the clients 106-112.

The controller 202 may be configured to include Window Management Instrumentation (WMI) 218 and a controller service 220. Imaging instructions 222 may be stored and processed by WMI 218 or a similar procedure.

The client 106 is configured with imaging tools 224 and an agent 226, which provide functionality seen in some of the discussion of FIGS. 8-12.

Exemplary Methods

Exemplary methods for implementing variable play speed control of media streams will now be described with primary reference to the flow diagrams of FIGS. 3-12. The methods are exemplary of the operation of the implementations discussed above with respect to FIGS. 1-2. The elements of the described methods may be performed by any appropriate means including, for example, hardware logic blocks on an ASIC or by the execution of processor-readable instructions defined on a processor-readable medium.

A "processor-readable storage medium," as used herein, can contain, store, communicate or transport instructions for use by or execution by a processor. A processor-readable storage medium can be, without limitation, an electronic, magnetic, optical, electromagnetic or semiconductor system, apparatus or device. A processor-readable storage medium may include an electrical connection having one or more wires, a portable computer diskette, a random access memory (RAM), a read-only memory (ROM), an erasable programmable-read-only memory (EPROM or Flash memory), an optical fiber, a rewritable compact disc (CD-RW), or a portable compact disc read-only memory (CDROM).

Figure 3:
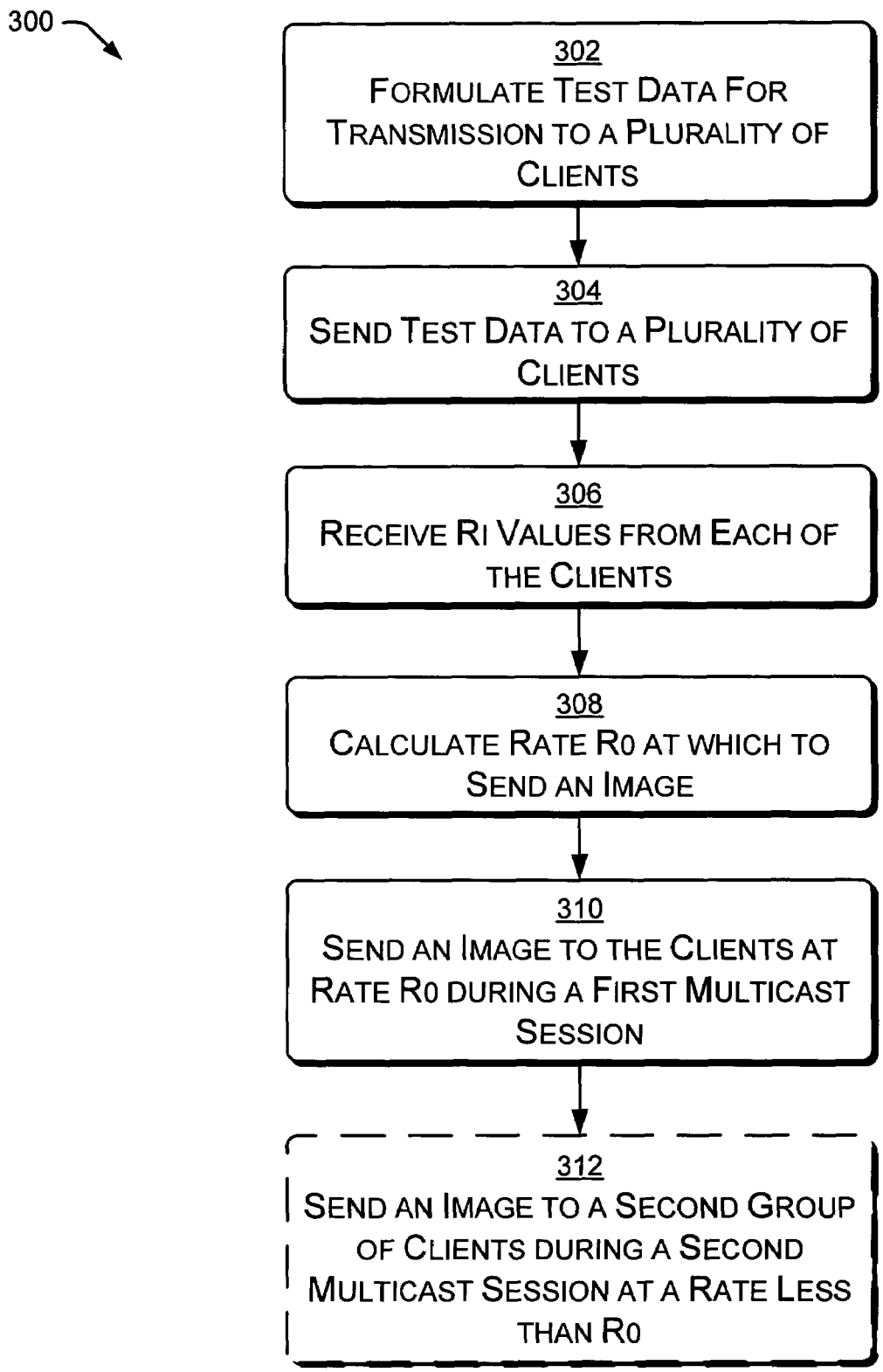
FIG. 3 is a flow diagram that describes an implementation of the operation of a server.

FIG. 3 is a flow diagram that describes an implementation 300 of the operation of a server 102. At block 302, the test data generation module 204 or similar procedure generates test data 206 for transmission to a plurality of clients 106-112. In a preferred implementation, the test data 206 is a subset of an image 208 to be sent to the plurality of clients. This gives the clients exposure to realistic data, and makes the $R_i$'s generated by the clients more accurate.

At block 304, the test data 206 is sent to a plurality of clients 106-112. In a preferred implementation, the test data 206 is sent by reliable multicasting over the network 104 to the clients 106-112. At block 306, the server receives the $R_i$ values via UDP from each, or at least some, of the clients. The $R_i$ values include the rate (R) at which the "$i^{th}$" client received the test data 206. (E.g., R(249) (i=249) would be the rate at which the $249^{th}$ client received the test data.) In a further example, while the data may have been sent by the server 102 at 25 mb/sec., it may have actually been received, decrypted, decompressed and written to disk by a particular client at 22 mb/sec. Accordingly, that client would return an $R_i$ to the server of 22 mb/sec. Since this client was not processing data as fast as it came in, its buffer would eventually overflow, resulting in a failure of the image to transfer.

At block 308, a rate $R_0$ is calculated by the server 102. The rate $R_0$ is the rate at which the image 208 will be sent to the clients 106-112. The rate $R_0$ is a function of at least some of the $R_i$'s sent by the clients. For example, if the $R_i$'s include low values (i.e. the clients are receiving data slowly), the value of $R_0$ would also have to be low, to allow the clients to successfully receive the data. At block 310, the image 208 is sent to the clients at the selected rate of $R_0$ during a first multicast session.

Optionally at block 312, the image may be resent to a second group of clients during a second multicast session. For example, where a group of clients were unable to process the data sent by the multicast at the rate $R_0$, a new—smaller— value for $R_0$ could be selected. The smaller value of $R_0$ could be used in the second multicast session, thereby allowing the group of clients to receive the image 208.

FIG. 4 shows alternative implementations of the test data formulation block 302 of FIG. 3. In particular, FIG. 4 shows alternative configurations of the operation of the test data generation module 204. In a first alternative 402, the test data is formed by configuring the test data generation module 204 to select an algorithm which obtains a selected percentage of the image file 208 to form the test data 206.

In a second alternative 404 and variation of alternative 1, the test data generation module 204 is configured to vary the amount of test data generated or the percentage of the image file 208 selected. Such varying allows for control over the balance between the reliability and the cost of the estimation of the value for $R_0$. For example, where the test data file 206 contains a greater percentage of the data within the image file 208, the $R_i$'s will tend to better reflect the client's ability to receive data at the $R_i$ rate. Accordingly, the $R_0$ value, which is a function of the $R_i$'s, will also be more accurate. However, there is cost and overhead associated with the use of a larger test data file 206.

In a third alternative 406, the test data generation module 204 is configured to obtain a quantity of data of a selected size from the image 208. Thus, the size of the test data is prescribed. In a fourth alternative 408, the size of the test data is selected to result in the transmission of the test data in a selected period of time, at a given rate. Thus, the time during which the test data is transmitted is prescribed.

FIG. 5 shows optional elements 502-508 in implementations of the send test data block 304 of FIG. 3. At block 502, the test data 206 is sent to the clients 106-112 by a reliable multicast session. Alternatively, other multicast or data cast technologies could be substituted.

At block 504, the server 102 is configured to send an initial transmission of data. Following the initial transmission, a timer is set. Transmission of the data within the test data file 206 is continued until the timer expires (times out).

At block 506, the server 102 is configured to send test data formed from a portion of the image at an initial transfer rate, which is typically selected to be fairly high, relative to an expectation of the rate at which the clients can receive and process the data. In a further variation, at block 508, the server is configured to send, as test data, a first portion of the image at a first rate of transmission in a first multicast. A second portion of the image is then sent at a second rate (typically slower) in a second multicast. The two transmissions can be compared, (by comparing two sets of $R_i$'s from the clients) to determine how well the clients were able to process data at the two speeds.

FIG. 6 shows optional elements 602-606 in implementations of the receive $R_i$ data block 306 of FIG. 3. At block 602, the server 102 is configured to receive UDP packets from each client 106-112. Use of UDP packets allows the number of clients to be scaled up without significantly increasing the overhead to the server 102.

At block 604, each client 106-112 optionally transfers data-transfer statistics to the server. For example, the following statistics could be sent to the server: highest instantaneous rate; average rate; last received rate; bytes of received data, etc.

At block 606, in an optional embodiment, the server 102 initiates a timer to indicate a maximum period during which the server will wait for clients to respond by sending their $R_i$ values (and possibly additional data-transfer statistics) to the server following transmission of the test data 206. Accordingly, the server accumulates the $R_i$ values during the period of timer operation. Following expiration of the timer, the server assumes that the clients from whom no response (e.g. a UDP packet with an $R_i$ value) was received sent UDP packets which were lost, or that another error prevented the client from making a response.

FIG. 7 shows alternative implementations of the calculate $R_O$ block 308 of FIG. 3, wherein the $R_O$ calculation module 212 of the server calculates the $R_O$ value (i.e. the rate at which the image 208 will be sent) using the $R_i$ values as input. In a first alternative method of calculating $R_O$, seen at block 702, $R_o$ is set as a function of the minimum $R_i$. For example, $R_O$ may be set equal to the minimum $R_i$ for all i. That is, $R_O$ is set equal to the slowest of the $R_i$. Accordingly, all of the clients will have demonstrated the ability to download and process data at the rate ($R_O$) at which the image will be multicast.

In a second alternative method of calculating $R_O$, seen at block 704, the clients are divided into at least two groups as a function of their $R_i$ values. For example, the clients may be divided into a faster group and a slower group. The value for $R_O$ is then set as a function of the minimum $R_i$ in one of the groups. For example, $R_O$ may be set equal to the minimum $R_i$ value in one of the groups. In a further example, where $R_O$ is set equal to the smallest $R_i$ in the faster group, all of the members of the faster group will probably be successful in receiving the image by the multicast.

In a third alternative method of calculating $R_O$, seen at block 706, the $R_O$ calculation module 212 selects one value of $R_i$ associated with one of the clients. For example, the $R_i$ selected may be the average value of the $R_i$'s. The value of $R_O$ is then set equal to the selected $R_i$, less a de-rating factor (i.e. an arbitrary amount by which the value of $R_O$ is set below the selected $R_i$, so that the client associated with the $R_i$ (and other similar clients) will be able to receive the image if downloaded at the $R_O$ value.

Figure 8:
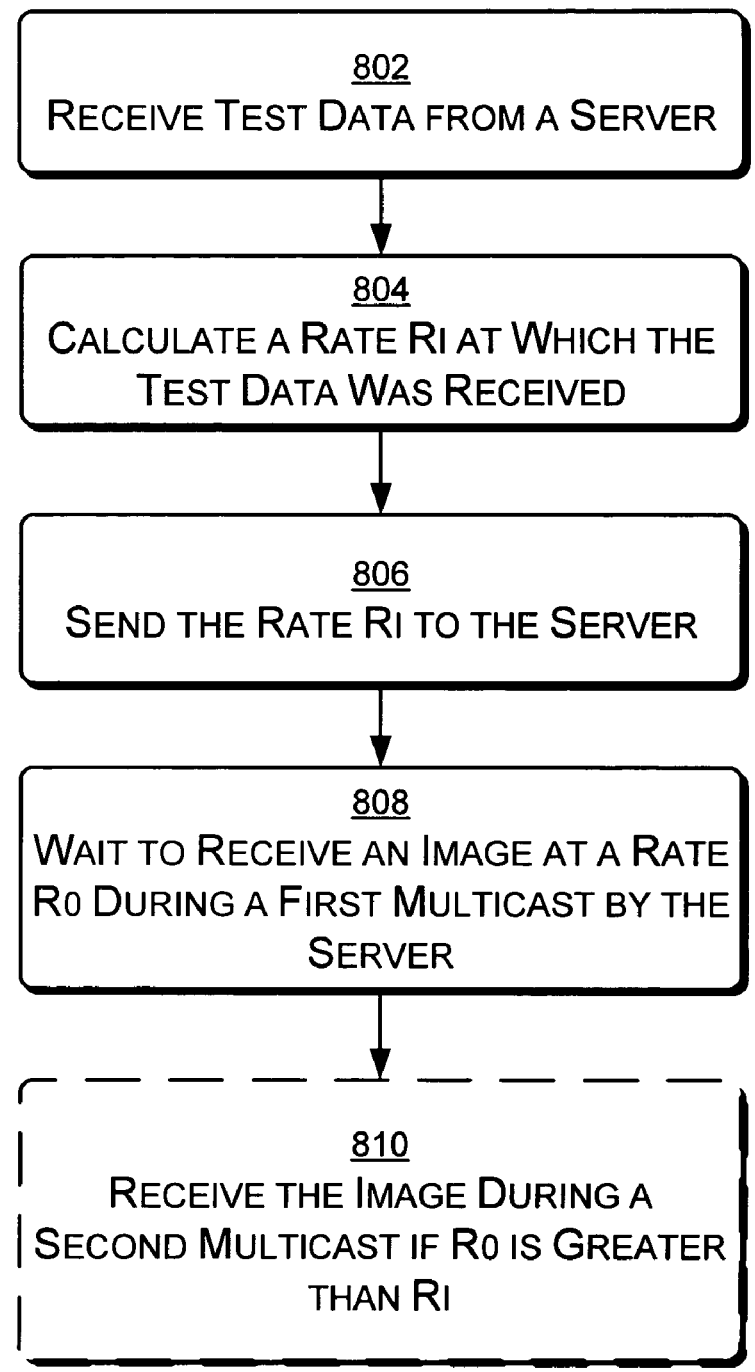
FIG. 8 is a flow diagram that describes an implementation of the operation of a client.

FIG. 8 is a flow diagram that describes an implementation 800 of the operation of a client 106-112. At block 802, test data 206 is received from the server. Referring to FIG. 9, optional elements which may be included within implementations of the receive test data block 802 of FIG. 8. As seen in FIG. 9, three representative, optional means by which the client may receive test data are presented. The functionality of blocks 802 and FIG. 9 may reside within a data reception module, which may be defined within the agent 226. At block 902, the client simply receives the test data 206 in the form of a portion of the image 208. At block 904, upon receipt of an initial packet of test data, the client starts a timer. During the operation of the timer, the client continues to receive test data. Upon expiration—or firing—of the timer, the client stops receiving the test data. At block 906, the received data may be decrypted, decompressed and written to a hard disk.

Returning to FIG. 8, at block 804, the client calculates an $R_i$ value based at least in part on the rate at which the data was received. In particular, the $R_i$ value reflects the client's ability to receive the data, decrypt the data (if necessary), decompress the data and to write the data to a hard disk. As seen in FIG. 10, three representative, alternative means by which the $R_i$ value may be calculated are presented. The functionality of block 804 and FIG. 10 may reside within $R_i$ calculation module, which may be defined within the agent 226. These three methods are representative of the many methods which could be substituted. At block 1002, the rate $R_i$ is set equal to, or as a function of, an average rate at which the client receives data. Similarly, at block 1004, the value $R_i$ could be set at a minimum rate at which the client received data. In a still further method of calculating $R_i$, at block 1006 the rate $R_i$ may be selected according to any desired method, such as selecting the average rate of data reception. Then the selected value of $R_i$ is "de-rated" or reduced to result in a lower, and therefore safer assumption of the rate at which the client is prepared to receive, process and store data.

At block 806, the rate $R_i$ is sent to the server by the client. The functionality of block 806-810 may reside within an $R_i$ management module, and may be defined within the agent 226. As seen in FIG. 11, two optional features or elements may be performed. At block 1102, the client may utilize UDP packets when sending the rate $R_i$ to the server. Where the clients utilize UDP packets, communication may not be as reliable as when using TCP; however, use of UDP packets allows the number of clients to be increased with only an incremental increase in overhead. At block 1104, in a further optional element, the clients may send the server additional transfer rate statistics, in addition to the key statistic: the rate $R_i$ at which data was received.

Returning to FIG. 8, at block 808 the client waits for the image data to be transmitted from the server, particularly where the rate $R_O$ at which the server will transmit data is slower than the rate $R_i$ at which the client was able to receive test data. Optionally, at block 810, the client may receive the image in a second multicast from the server, where the rate of the first multicast was greater than the ability of the client to receive and process data. In this case, the client may receive the image in the second multicast, which is sent using a second $R_0$ that is slower than the first $R_0$.

Figure 12:
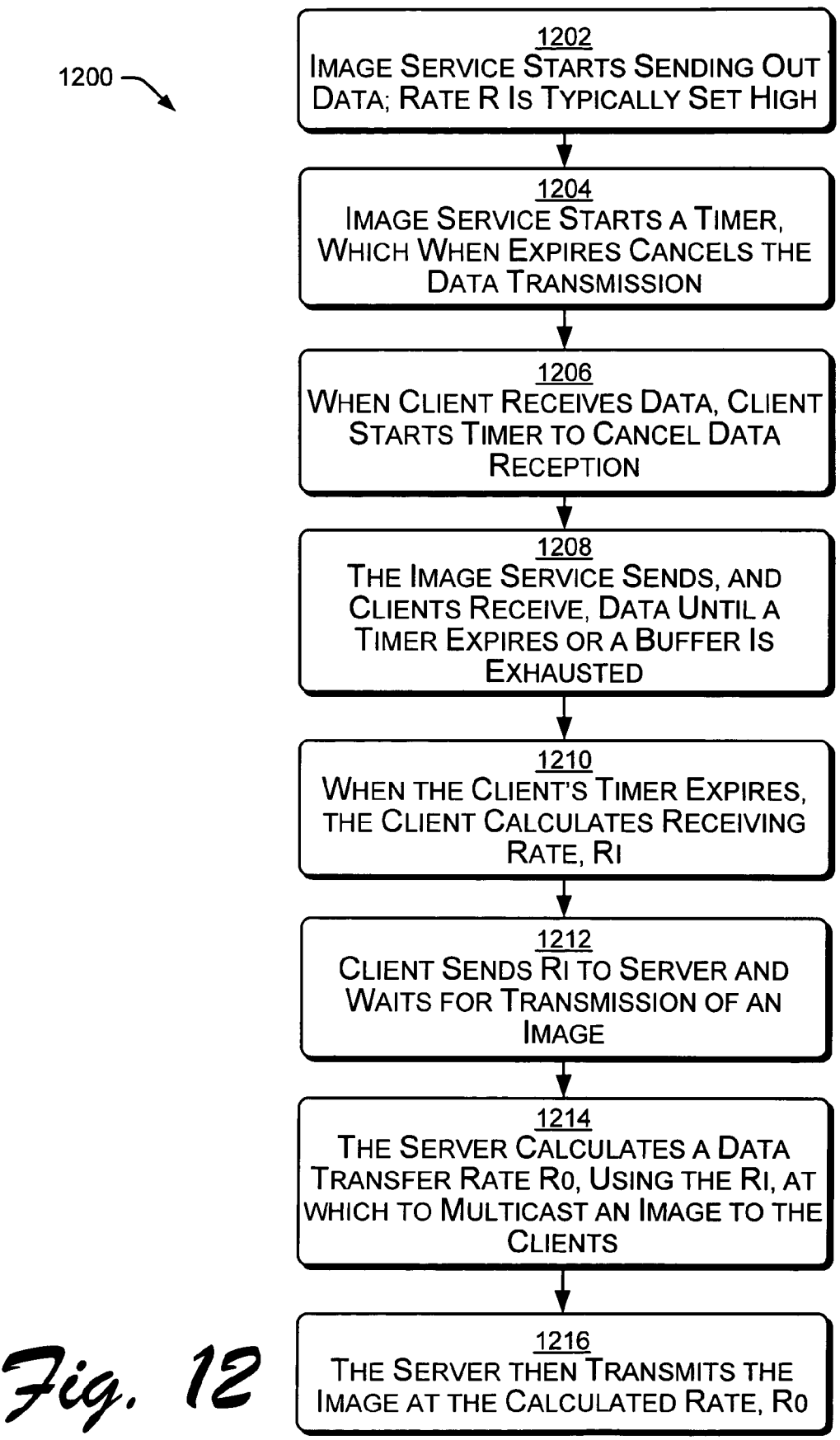
FIG. 12 is a flow diagram that describes an implementation of the operation of a system, wherein a multicast transfer rate is determined.

FIG. 12 is a flow diagram that describes an implementation 1200 of the operation of a system, wherein a multicast transfer rate is determined.

At block 1202, an image service or server 102 starts sending out test data 206 at a rate specified by a controller 202. The test data is sent out by a multicast or data cast technology, such as reliable multicast. The test data is typically generated according to one of the alternatives seen in FIG. 4, or to an alternate algorithm, as desired. Typically, that rate of data transmission, R, is set to the highest rate practicable for later transmission of an image 208.

At block 1204, the server 102 start a timer, which when it expires, cancels the transmission of the test data 206. The timer may be set for N minutes, such as 30 seconds, 2 minutes, etc.

At block 1206, when the client 106-112 receives the first of the test data 206, the client starts a timer. When the timer expires, the client stops receiving and processing the test data 206. The client's timer is typically set for the same value, e.g. N minutes, as the server's timer.

At block 1208, the server's continues to send data until the timer on the server expires. Similarly, the clients each continue to receive data until their respective timers expire or until they have a buffer overflow (due to their failure to receive and process the test data rapidly enough). During this period, the overall receiving rate and instantaneous receiving rates are saved by each client, as well as other data-transfer statistics. If the server finishes sending data before the client's timer fires, the client waits until the client's timer does fire. Where the client's buffer overflows (e.g. due to the client's inability to receive and process data at the rate at which the server was sending it), the client waits for it timer to expire.

At block 1210, upon expiration of the client's timer, the client calculates the client's receiving rate, $R_i$. The $R_i$ calculated by each client can be based on the overall and instantaneous receiving rates during the transmission of the test data. For example, as we seen previously in FIG. 10, the receiving rate may be calculated in a variety of methods.

At block 1212, the client sends the calculated value of $R_i$ to the server, typically by transmission of UDP packets. Additionally, the client may also include other data-transfer statistics within the transmission to the server. Because there could be "T" clients (targets), the $R_i$ received by the server would include $R_i$ where i=1 to T. After sending $R_i$ to the server, each client waits for transmission of the image data 208.

At block 1214, the server 102 calculates the rate $R_0$ based on the $R_i$ the server received from the clients. The calculation of $R_0$ could be made by the $R_0$ calculation module 212, and could be made in manner similar to that seen in FIG. 7. Following calculation of $R_0$, server may delay for several seconds.

At block 1216, the server sends the image data at the rate $R_0$ calculated at block 1214, using a reliable multicast transmission, or alternate data cast technology.

While one or more methods have been disclosed by means of flow diagrams and text associated with the blocks of the flow diagrams, it is to be understood that the blocks do not necessarily have to be performed in the order in which they were presented, and that an alternative order may result in similar advantages. Furthermore, the methods are not exclusive and can be performed alone or in combination with one another.

Exemplary Computer

Figure 13:
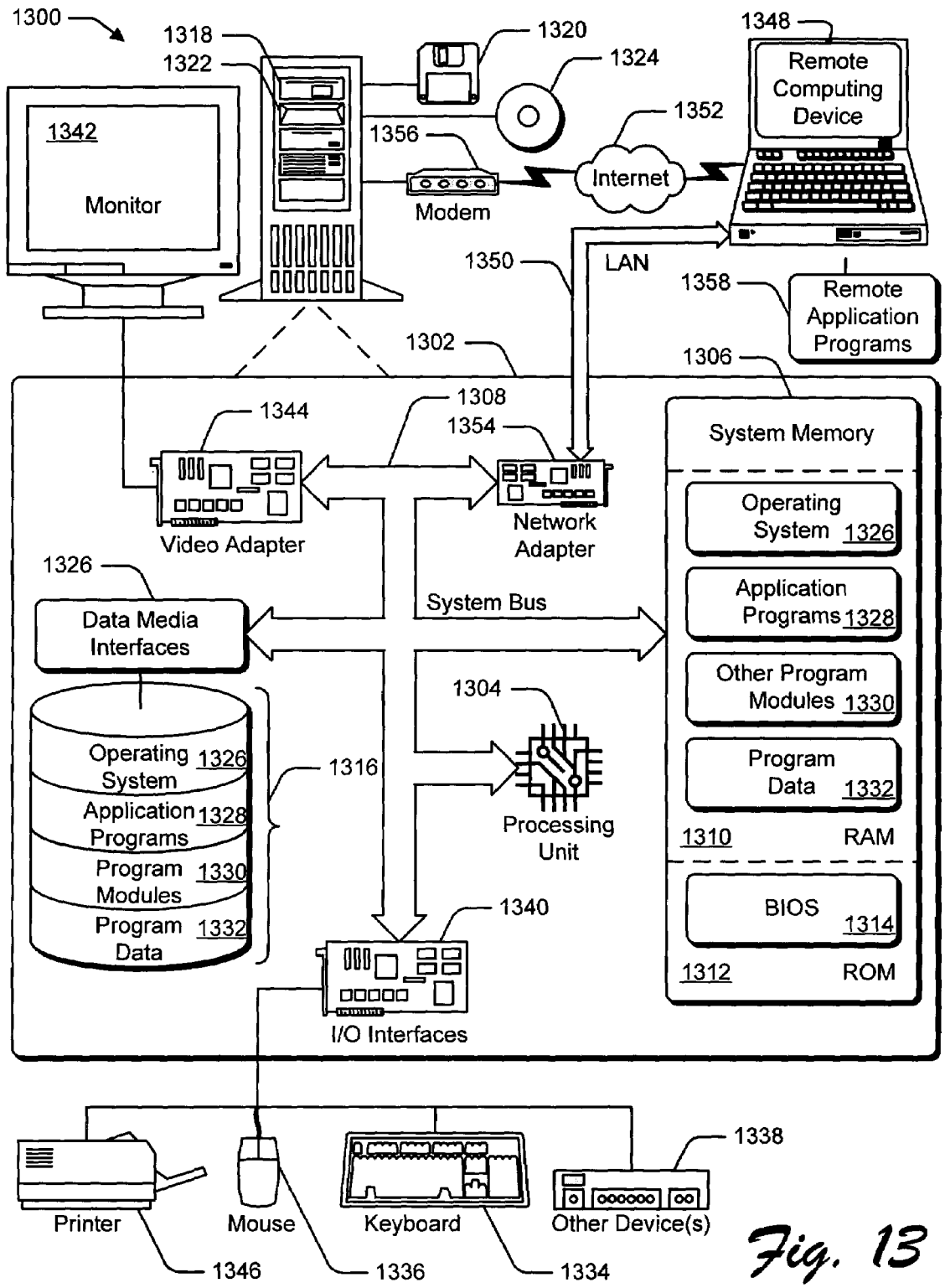
FIG. 13 illustrates an exemplary computing environment suitable for implementing a client or server computing device.

FIG. 13 illustrates an exemplary computing environment suitable for implementing a client or server computing device. Although one specific configuration is shown, the server 102 and client 106-112 may be implemented in other computing configurations. The computing environment 1300 includes a general-purpose computing system in the form of a computer 1302. The components of computer 1302 can include, but are not limited to, one or more processors or processing units 1304, a system memory 1306, and a system bus 1308 that couples various system components including the processor 1304 to the system memory 1306.

The system bus 1308 represents one or more of any of several types of bus structures, including a memory bus or memory controller, a peripheral bus, an accelerated graphics port, and a processor or local bus using any of a variety of bus architectures. An example of a system bus 1308 would be a Peripheral Component Interconnects (PCI) bus, also known as a Mezzanine bus.

Computer 1302 typically includes a variety of computer readable media. Such media can be any available media that is accessible by computer 1302 and includes both volatile and non-volatile media, removable and non-removable media. The system memory 1306 includes computer readable media in the form of volatile memory, such as random access memory (RAM) 1310, and/or non-volatile memory, such as read only memory (ROM) 1312. A basic input/output system (BIOS) 1314, containing the basic routines that help to transfer information between elements within computer 1302, such as during start-up, is stored in ROM 1312. RAM 1310 typically contains data and/or program modules that are immediately accessible to and/or presently operated on by the processing unit 1304.

Computer 1302 can also include other removable/non-removable, volatile/non-volatile computer storage media. By way of example, FIG. 13 illustrates a hard disk drive 1316 for reading from and writing to a non-removable, non-volatile magnetic media (not shown), a magnetic disk drive 1318 for reading from and writing to a removable, non-volatile magnetic disk 1320 (e.g., a "floppy disk"), and an optical disk drive 1322 for reading from and/or writing to a removable, non-volatile optical disk 1324 such as a CD-ROM, DVD-ROM, or other optical media. The hard disk drive 1316, magnetic disk drive 1318, and optical disk drive 1322 are each connected to the system bus 1308 by one or more data media interfaces 1326. Alternatively, the hard disk drive 1316, magnetic disk drive 1318, and optical disk drive 1322 can be connected to the system bus 1308 by a SCSI interface (not shown).

The disk drives and their associated computer-readable media provide non-volatile storage of computer readable instructions, data structures, program modules, and other data for computer 1302. Although the example illustrates a hard disk 1316, a removable magnetic disk 1320, and a removable optical disk 1324, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1316, magnetic disk 1320, optical disk 1324, ROM 1312, and/or RAM 1310, including by way of example, an operating system 1326, one or more application programs 1328, other program modules 1330, and program data 1332. Each of such operating system 1326, one or more application programs 1328, other program modules 1330, and program data 1332 (or some combination thereof) may include an embodiment of a caching scheme for user network access information.

Computer 1302 can include a variety of computer/processor readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 1302 via input devices such as a keyboard 1334 and a pointing device 1336 (e.g., a "mouse"). Other input devices 1338 (not shown specifically) may include a microphone, joystick, game pad, satellite dish, serial port, scanner, and/or the like. These and other input devices are connected to the processing unit 1304 via input/output interfaces 1340 that are coupled to the system bus 1308, but may be connected by other interface and bus structures, such as a parallel port, game port, or a universal serial bus (USB).

A monitor 1342 or other type of display device can also be connected to the system bus 1308 via an interface, such as a video adapter 1344. In addition to the monitor 1342, other output peripheral devices can include components such as speakers (not shown) and a printer 1346 which can be connected to computer 1302 via the input/output interfaces 1340.

Computer 1302 can operate in a networked environment using logical connections to one or more remote computers, such as a remote computing device 1348. By way of example, the remote computing device 1348 can be a personal computer, portable computer, a server, a router, a network computer, a peer device or other common network node, and the like. The remote computing device 1348 is illustrated as a portable computer that can include many or all of the elements and features described herein relative to computer system 1302.

Logical connections between computer 1302 and the remote computer 1348 are depicted as a local area network (LAN) 1350 and a general wide area network (WAN) 1352. Such networking environments are commonplace in offices, enterprise-wide computer networks, intranets, and the Internet. When implemented in a LAN networking environment, the computer 1302 is connected to a local network 1350 via a network interface or adapter 1354. When implemented in a WAN networking environment, the computer 1302 typically includes a modem 1356 or other means for establishing communications over the wide network 1352. The modem 1356, which can be internal or external to computer 1302, can be connected to the system bus 1308 via the input/output interfaces 1340 or other appropriate mechanisms. It is to be appreciated that the illustrated network connections are exemplary and that other means of establishing communication link(s) between the computers 1302 and 1348 can be employed.

In a networked environment, such as that illustrated with computing environment 1300, program modules depicted relative to the computer 1302, or portions thereof, may be stored in a remote memory storage device. By way of example, remote application programs 1358 reside on a memory device of remote computer 1348. For purposes of illustration, application programs and other executable program components, such as the operating system, are illustrated herein as discrete blocks, although it is recognized that such programs and components reside at various times in different storage components of the computer system 1302, and are executed by the data processor(s) of the computer.

CONCLUSIONS

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A processor-readable storage medium comprising processor-executable instructions for:
    sending test data from a server to a client, wherein the test data comprises a first portion of an image sent at a first rate, and a second portion of the image sent at a second rate;
    varying an amount of the test data sent to balance reliability and cost;
    receiving the test data, sent by the server, at clients located on a network; calculating a value for $R_i$ based at least in part on a rate at which the test data was received by each client;
    dividing the clients into at least two groups, comprising first and second groups of clients, wherein the first group of clients was able to receive the test data faster than the second group of clients based on the $R_i$ values; and
    opening first and second multicast sessions with the first and second groups, respectively, wherein a transmission rate $R_0$ of the first session is higher than a transmission rate $R_0$ of the second session.

2. The processor-readable storage medium as recited in claim 1, wherein the test data was received during a reliable multicast session.

3. The processor-readable storage medium as recited in claim 1, wherein receiving the test data comprises instructions for:
    receiving an initial transmission of the test data;
    setting a timer; and
    receiving additional test data until the timer expires.

4. The processor-readable storage medium as recited in claim 1, wherein receiving the test data comprises instructions for receiving a portion of the image at an initial transfer rate.

5. The processor-readable storage medium as recited in claim 1, wherein receiving the test data comprises instructions for:
    decrypting and decompressing the initial transmission of the test data; and
    writing the decrypted and decompressed test data to a disk.

6. The processor-readable storage medium as recited in claim 1, wherein sending the $R_i$ comprises instructions for sending a UDP packet to the server.

7. The processor-readable storage medium as recited in claim 1, wherein sending the rate $R_i$ comprises instructions for sending data-transfer statistics including the rate $R_i$ to the server in a UDP packet.

8. The processor-readable storage medium as recited in claim 1, wherein calculating the rate $R_i$ comprises instructions for setting the rate $R_i$ equal to an average rate at which data was received.

9. The processor-readable storage medium as recited in claim 1, wherein calculating the rate $R_i$ comprises instructions for setting rate $R_i$ equal to a minimum rate at which data was received.

10. The processor-readable storage medium as recited in claim 1, wherein calculating the rate $R_i$ comprises instructions for:
setting the rate $R_i$ as a function of the rate at which data was received; and
de-rating the rate $R_i$ to result in a safer value.

11. The processor-readable storage medium as recited in claim 1, additionally comprising instructions for receiving an image at a rate $R_O$ during a first multicast session if $R_O$ is less than $R_i$.

12. The processor-readable storage medium as recited in claim 11, additionally comprising instructions for receiving the image during a second multicast session if $R_O$ is more than $R_i$.

13. A method for determining a transfer rate to multicast an image, comprising:
sending test data from a server to a plurality of clients, wherein the test data comprises a first portion of an image sent at a first rate, and a second portion of the image sent at a second rate, and wherein the sending allows varying an amount of the test data sent to balance reliability and cost;
calculating $R_i$ values for at least some of the plurality of clients based at least in part on rate of receipt of the test date;
sending the $R_i$ values from each of the plurality of clients to the server for each of the first and second portions of the test data;
dividing the clients into at least two groups, wherein the groups are based on faster and slower values of the calculated $R_i$;
opening first and second multicast sessions with first and second groups of clients, respectively; and
calculating first and second rates $R_O$ at which to send the image from the server to the first and second groups, wherein the rates $R_O$ are a function based at least in part on at least some of the $R_i$ values, and one of the rates $R_O$ is faster than the other.

14. The method as recited in claim 13, wherein the test data is sent over a reliable multicast session.

15. The method as recited in claim 13, wherein sending test data comprises:
sending an initial transmission of the test data from the server;
setting a timer on the server;
receiving the initial transmission of the test data on each client;
setting a timer on each client;
sending additional test data until the timer on the server expires.

16. The method as recited in claim 13, wherein sending test data comprises sending a portion of the image at an initial transfer rate.

17. The method as recited in claim 13, wherein the test data is:
a selected percentage of the image;
a selected amount of data obtained front the image; or
data obtained from the image of a size calculated for transmission within a selected period of time.

18. The method as recited in claim 13, wherein the $R_i$ values are sent from at least some of the plurality of clients to the server via a UDP packet.

19. The method as recited in claim 13, wherein sending $R_i$ values comprises:
setting a timer on the server to indicate a maximum period of time during which the server will wait for a response from the plurality of clients; and
transferring data-transfer statistics from the plurality of clients to the server within the maximum period.

20. The method as recited in claim 13, wherein calculating the rate $R_O$ comprises setting the rate $R_O$ equal to a minimum of the $R_i$ values for all i.

21. The method as recited in claim 13, wherein calculating the $R_O$ comprises:
dividing the plurality of clients into at least two groups; and
setting $R_O$ as a function of a minimum $R_i$ associated with clients within one of the at least two groups.

22. The method as recited in claim 13, wherein calculating the $R_O$ comprises:
selecting one of the $R_i$; and
setting $R_O$ as a function of the selected $R_i$, less a de-rating factor.

23. The method as recited in claim 13, wherein calculating the rate $R_O$ comprises:
forming at least two groups of clients, wherein the forming is based on the $R_i$'s of the clients;
selecting a smallest $R_i$ associated with a client from within the at least two groups of clients; and
setting $R_O$ as a function of the selected smallest $R_i$.

24. A method of determining a transfer rate to multicast an image from a server, comprising:
sending test data to a plurality of clients, wherein the test data comprises first and second portions of an image which are sent to the plurality of clients at first and second data transfer rates, wherein sending test data allows varying an amount of test data sent to balance reliability and cost;
receiving a rate $R_i$, from each of the plurality of clients, wherein the $R_i$ are based at least in part on a rate at which the test data was received by each of the plurality of clients;
dividing the plurality of clients into at least two groups, comprising first and second groups of clients, wherein the first group of clients was able to receive data faster than the second group of clients;
calculating first and second data transfer rates $R_O$, for each of first and second multicast sessions; and
opening the first and second multicast sessions, within which the image is sent to the first and second groups of clients, respectively, wherein the rates $R_O$ are a function of the $R_i$, and the first $R_O$ is fasteer than the second $R_O$.

25. The server as recited in claim 24, wherein the means for sending test data comprises means for operating a reliable multicast session.

26. The method as recited in claim 24, wherein calculating the $R_O$ comprises setting the rate $R_O$ equal to a minimum value of the rate $R_i$ for all i.

27. The method as recited in claim 24, wherein sending test data comprises sending:
a selected percentage of the image;
a selected amount of data obtained from the image; or
data obtained from the image of a size calculated for transmission within a selected period of time.

28. The method as recited in claim 24, additionally comprising sending the image at the rate $R_O$ during a first multicast session.

29. The method as recited in claim 24, wherein receiving the rate $R_i$ comprises:

setting a timer to indicate a maximum period of time during which to wait for a response from the plurality of clients; and receiving data-transfer statistics from the at least some of the plurality of clients within the maximum period.

30. The method as recited in claim 24, wherein sending test data comprises setting a timer to indicate a maximum period of time during which to send the test data to the plurality of clients.

* * * * *